United States Patent
Aoki

(10) Patent No.: US 8,631,285 B2
(45) Date of Patent: Jan. 14, 2014

(54) CONTENT DATA RECORDING APPARATUS AND METHOD

(75) Inventor: Toshiaki Aoki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 932 days.

(21) Appl. No.: 12/180,863

(22) Filed: Jul. 28, 2008

(65) Prior Publication Data

US 2009/0138783 A1     May 28, 2009

(30) Foreign Application Priority Data

Nov. 26, 2007    (JP) ................................ 2007-305076

(51) Int. Cl.
    *G06F 11/00*      (2006.01)

(52) U.S. Cl.
    USPC .......................................... 714/55; 714/764

(58) Field of Classification Search
    USPC ....................................................... 714/764
    See application file for complete search history.

(56) References Cited

U.S. PATENT DOCUMENTS

| | | | | |
|---|---|---|---|---|
| 6,226,202 B1 * | 5/2001 | Kikuchi | ................ | 365/185.33 |
| 6,333,888 B1 * | 12/2001 | Nakazawa | ................ | 365/230.03 |
| 6,959,141 B1 * | 10/2005 | Ichikawa et al. | ................ | 386/353 |
| 6,965,725 B1 * | 11/2005 | Ichikawa et al. | ................ | 386/264 |
| 7,257,763 B1 * | 8/2007 | Srinivasan et al. | ................ | 714/764 |
| 2003/0043647 A1 * | 3/2003 | Kanamori et al. | ................ | 365/200 |
| 2007/0041296 A1 * | 2/2007 | Chao et al. | ................ | 369/53.24 |
| 2007/0101206 A1 * | 5/2007 | Brabant | ................ | 714/55 |
| 2009/0070520 A1 * | 3/2009 | Mizushima | ................ | 711/103 |

FOREIGN PATENT DOCUMENTS

| | | |
|---|---|---|
| JP | 57105814 | 7/1982 |
| JP | 63069074 | 3/1988 |
| JP | 6-131895 | 5/1994 |

OTHER PUBLICATIONS

European Patent Office Communication Dated Mar. 29, 2010 for Application No. 08013665.8 (5 pages).

* cited by examiner

*Primary Examiner* — Kamini Patel
(74) *Attorney, Agent, or Firm* — Finnegan, Henderson, Farabow, Garrett & Dunner, LLP

(57) ABSTRACT

A content data recording apparatus includes a code addition unit adding an error correction code to an input content data, a data storing unit temporarily storing the content data, and outputting it, a plurality of nonvolatile memories that enable writing/reading of the content data, a generator generating a write address and a read address, a read buffer temporarily storing the read content data, and outputting it, an error correction unit correcting an error of the content data based on the error correction code, and giving correction impossible notification when the error is not corrected by the error correction code, and a controller carrying out a read control for reading content data from the nonvolatile memories, and carrying out a first rewrite control for controlling the data storing unit so that the data storing unit again outputs content data, and writing the content data again output to the nonvolatile memories.

9 Claims, 4 Drawing Sheets

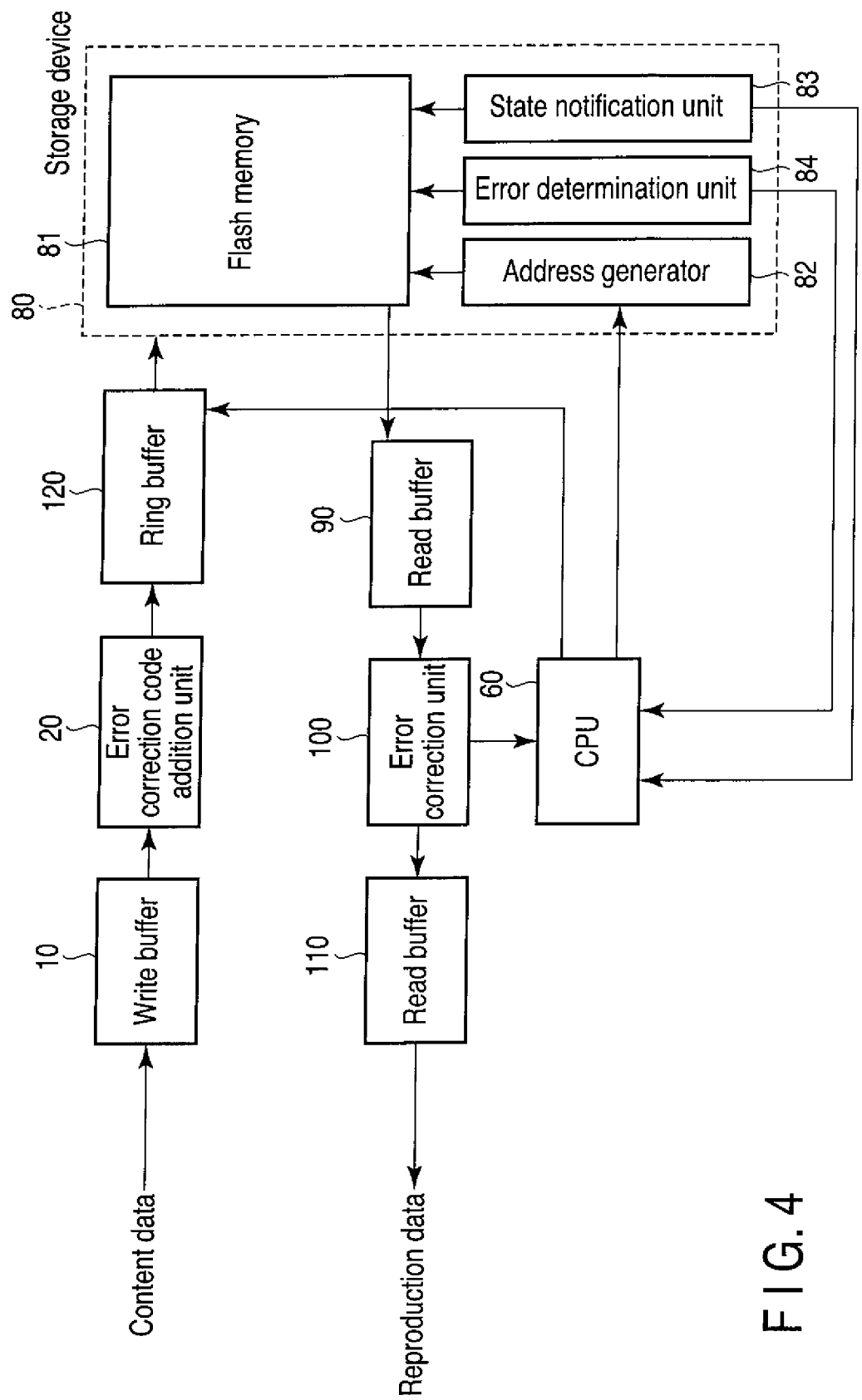
F I G. 4

CONTENT DATA RECORDING APPARATUS AND METHOD

CROSS-REFERENCE TO RELATED APPLICATIONS

This application is based upon and claims the benefit of priority from prior Japanese Patent Application No. 2007-305076, filed Nov. 26, 2007, the entire contents of which are incorporated herein by reference.

BACKGROUND OF THE INVENTION

1. Field of the Invention

The present invention relates to content data recording apparatus and method for recording content data such as audio and video data using a nonvolatile memory, for example.

2. Description of the Related Art

A content data recording apparatus such as digital camera and video camera acquires content data such as video and audio data, and then, records the content data in a storage unit. A flash memory has come to wide use because it has a large capacity and is obtained at a low price.

The content data recording apparatus has the following problem. Specifically, when content data is recorded, a write error may occur. In this case, input data sequentially changes; for this reason, the content data when an error occurs is lost. In general, the content data recording apparatus performs the following operation to prevent data loss when an error occurs. Specifically, error detection is made when data is written to a flash memory. If an error is detected, the data is again written to the flash memory.

However, even if the error is not detected in a write operation, there may be a case where data can not be read correctly in fact from the flash memory in a read operation due to a property of the flash memory. Considering the foregoing circumstances, a conventional content data recording apparatus needs to perform the following operation. Namely, the user recognizes recording data by making the chase reproduction during data recording or by reproducing the data after recorded, and thereafter, must detect an error.

According to a conventional error detection method, if the same input signal is again obtained, rewrite is possible; therefore, the lost data can be compensated for. However, if the same Input signal is not again obtained, for example, rewrite is impossible during collection of information in news. Thus, it is impossible to compensate for the data loss.

A method for effectively using of a memory area of the flash-type electrically erasable and programmable ROM (EEPROM) has been proposed (e.g., see Jpn. Pat. Appln. KOKAI publication No. H6-131895). In this proposal, error correction data required for error correction is written to a redundancy area of a flash-type EEPROM.

BRIEF SUMMARY OF THE INVENTION

An object of the invention is to provide content data recording apparatus and method for securely detecting an error in a write operation to record content data.

According to one aspect of the present invention, there is provided a content data recording apparatus comprising: a code addition unit adding an error correction code to an input content data; a data storing unit successively receiving the content data added with the error correction code, and temporarily storing the content data, and thereafter, outputting it; a plurality of nonvolatile memories that enable writing/reading of the content data; an address generator generating a write address when the content data successively output from the data storing unit is written to the nonvolatile memories and generating a read address when the content data is read from the nonvolatile memories; a read buffer temporarily storing the content data read from the nonvolatile memories, and outputting the read content data; an error correction unit correcting an error of the content data output from the read buffer based on the error correction code added to the content data, and giving correction impossible notification when the error is not corrected by the error correction code; and a controller carrying out a read control for reading content data from the nonvolatile memories when content data write to the nonvolatile memories is completed, and carrying out a first rewrite control for controlling the data storing unit so that the data storing unit again outputs content data when receiving the correction impossible notification from the error correction unit, and writing the content data again output to a new write address of the nonvolatile memories.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a block diagram showing the configuration of a content data recording apparatus according to a second embodiment of the present invention.

DETAILED DESCRIPTION OF THE INVENTION

Various embodiments of the present invention will be hereinafter described with reference to the accompanying drawings.

First Embodiment

Figure 1:
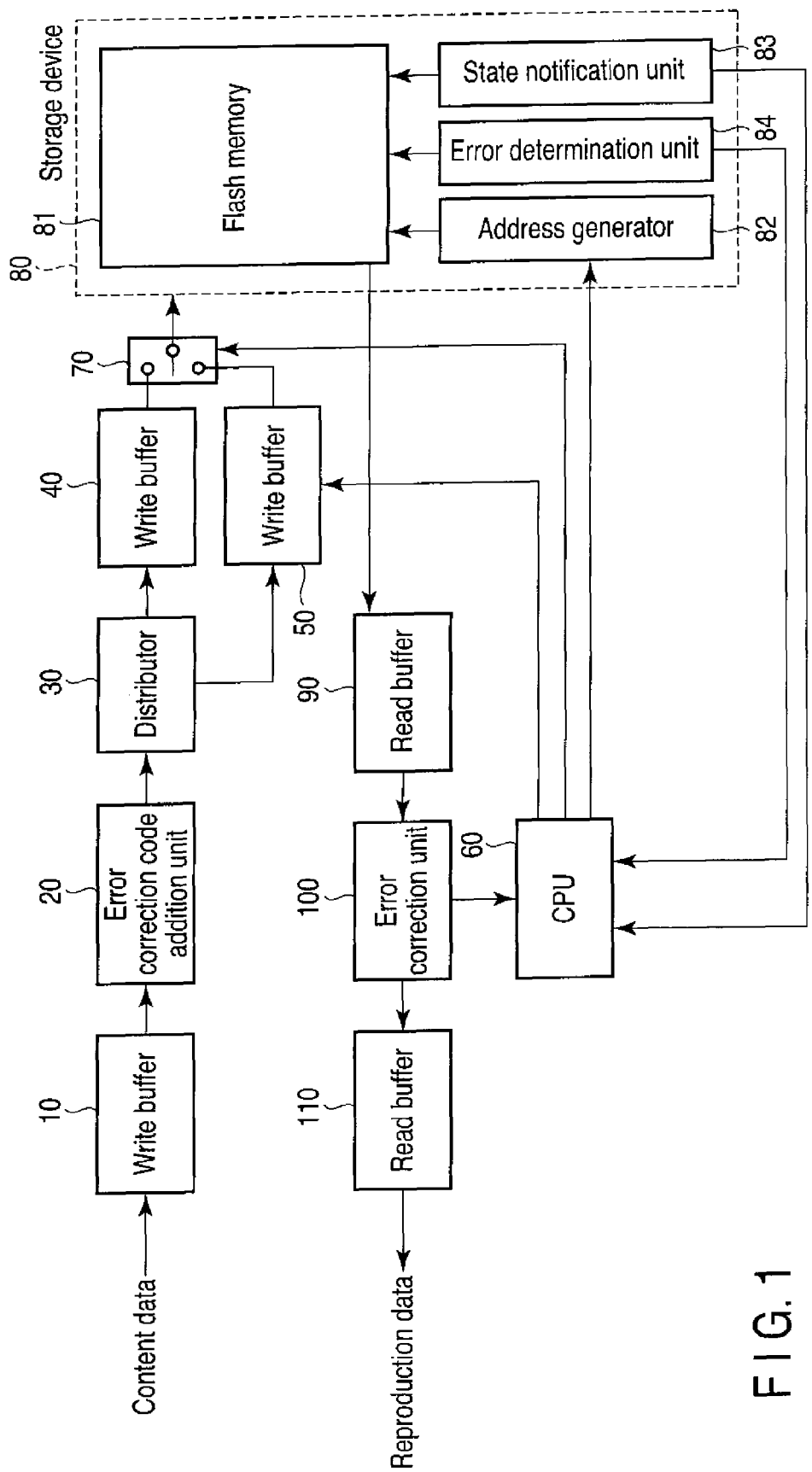
FIG. 1 is a block diagram showing the configuration of a content data recording apparatus according to a first embodiment of the present invention.

FIG. 1 is a block diagram showing the configuration of a content data recording apparatus according to a first embodiment of the present invention. In FIG. 1, input and output are independently shown to easily understand an operation inclusive of the case where a bus of this embodiment is a bidirectional bus.

Content data is video and audio having a frame format. When recording is started, the content data is supplied to a write buffer 10. The write buffer 10 temporarily holds the content data to take time matching with an error correction code addition unit 20. The error correction code addition unit 20 adds an error correction code to the content data output from the buffer 10. The content data added with the error correction code is distributed to two signals by a distributor 30. One of two signals is supplied to a write buffer 40 while the other thereof is supplied to a write buffer 50.

The write buffer 40 has a capacity equivalent to two pages. The buffer 40 outputs content data equivalent to one page when the content data remains more than one page.

The write buffer 50 has a capacity equivalent to two pages. The buffer 50 holds the same content data as the buffer 40. When the capacity equivalent to two pages becomes full, both buffers 40 and 50 overwrite new data in the order from data held at first. The buffer 50 holds content data equivalent to one page therein according to hold instructions from a central processing unit (CPU) 60, and then, inhibits an overwrite operation. When receiving output instructions from the CPU 60, the buffer 50 outputs the held content data equivalent to one page.

A switching unit 70 receives content data output from the buffers 40 and 50, and selectively outputs one content data of the buffers 40 and 50 to a storage device 80. Usually, the switching unit 70 outputs the content data from the buffer 40.

The storage device 80 includes a flash memory 81, an address generator 82, a state notification unit 83 and an error detector. The flash memory 81 can store content data written in units of pages. The address generator 82 generates write/read address in the flash memory 81. The storage device 80 writes the output content data to the flash memory 81 according to a write address generated by the address generator 82.

When write to the flash memory 81 is started, the state notification unit 83 gives notification that the flash memory 81 is in a busy state to the CPU 60. When write to the flash memory 81 is completed, the state notification unit 83 gives notification that the busy state ends to the CPU 60.

The error detector 84 detects an error in a write operation of content data to the flash memory 81. When detecting a write error, the error detector 84 notifies the CPU 60 that the write error occurs.

The content data written to the flash memory 81 is read according to instructions from the CPU 60. A read buffer 90 temporarily holds the read content data to take time matching with an error correction unit 100, and thereafter, outputs the read content data to the error correction unit 100.

The error correction unit 100 intactly passes the content data based on the error correction code added to the content data if no error occurs in a write operation. The error correction unit 100 corrects an error of the content data if an error occurs in a write operation. If the foregoing error is correctable by the error correction code, the error correction unit 100 outputs the corrected content data to a read buffer 110. Conversely, if the error of the read content data is not correctable, the error correction unit 100 gives correction impossible notification to the CPU 60. The content data output to the buffer 110 is temporarily held, and thereafter, output outside as reproduction data.

Figure 2:
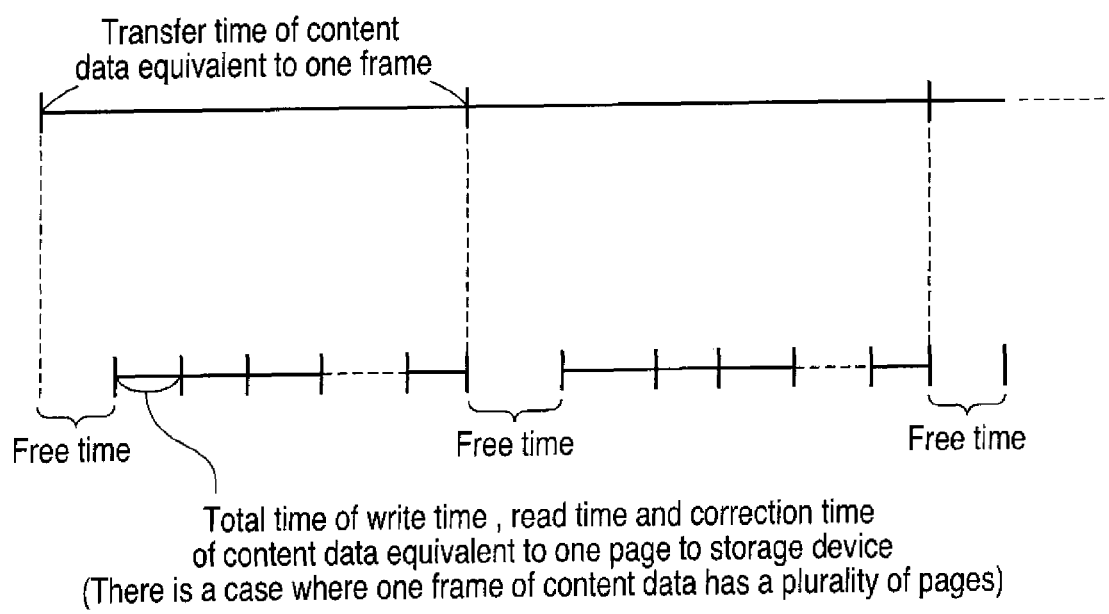
FIG. 2 is a schematic view to explain the relationship between processing time of a storage unit and an error correction unit shown in FIG. 1 and transfer time of content data.

FIG. 2 is a schematic view to explain the relationship between processing time of a storage device 80 and an error correction unit 100 according to a first embodiment of the present invention and processing time of processing continuously input content data every frame. In FIG. 2, the case where content data equivalent to one frame ranges a plurality of pages is given as one example. In order to realize the foregoing processing, a content data recording apparatus must be designed sufficiently considering write/read time to the flash memory 81 and error correction time in the error correction unit 100. Specifically, the storage device 80 and the error correction unit 100 must be designed to satisfy the following condition so that time of rewriting content data having an error to the flash memory 81 is secured. According to the condition, the total time of write time, read time and error correction time of the content data is shortened more than time of processing content data equivalent to one page with respect to time of inputting one frame content data. The CPU 60 completes rewrite of the content data within a free time thus produced.

Figure 3:
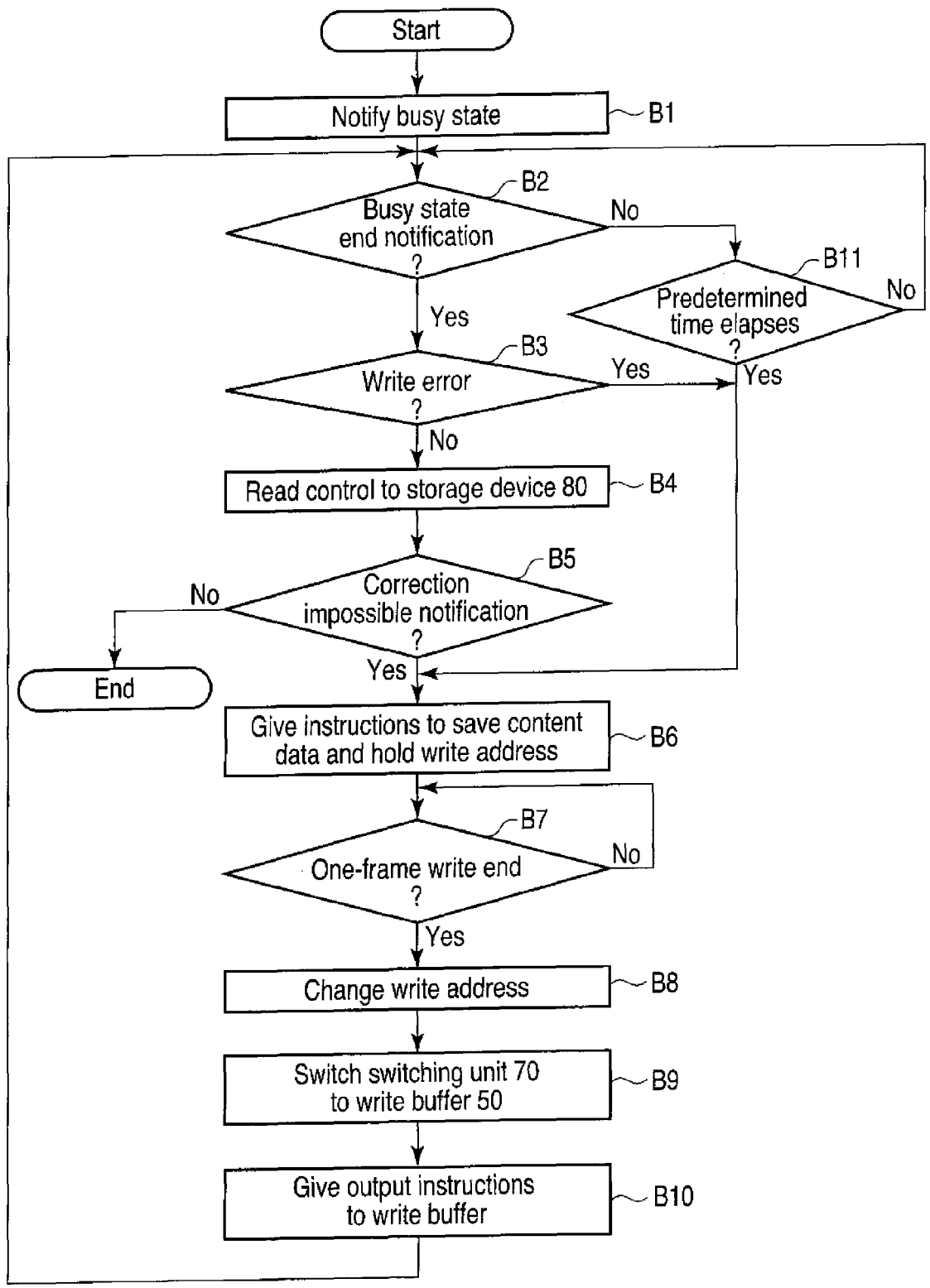
FIG. 3 is a flowchart to explain the rewrite procedure by a CPU of FIG. 1.

The CPU 60 controls write/read of content data to the storage device 80 so that normal content data is stored in the storage device 80. FIG. 3 is a flowchart to explain the content data rewrite procedure by the CPU 60 according to the first embodiment of the present invention.

The content data from the buffer 40 is supplied to the storage device 80, and then, written to the flash memory 81 according to a write address generated by the address generator 82. When write is started, the state notification unit 83 gives notification that the flash memory 81 is in a busy state to the CPU 60 (block B1). The CPU 60 determines whether or not notification that the busy state ends is given when the flash memory 81 is in the busy state (block B2). If the notification that the busy state ends is given (Yes in block B2), the CPU 60 determines whether or not notification that a write error is detected is supplied from the error detector 84 (block B3). If there exist no notification that the write error is detected (No in block B3), the CPU 60 determines that write to the flash memory 81 ends safely. Then, the CPU 60 reads the written content data (block B4). The CPU 60 determines whether or not correction impossible notification from the error correction unit 100 is given (block B5). If the notification is not given (No in block B5), the CPU 60 ends the procedure because the content data is normally stored in the storage device 80.

Conversely, if the correction impossible notification from the error correction unit 100 is given (Yes in block B5), the CPU 60 outputs save command to the buffer 50, and holds the write address of the content data (block B6). In this way, the same content data as the content data output to the storage device 80 from the buffer 40 is stored in the buffer 50. Then, the CPU 60 determines whether or not the one-frame content data procedure ends (block B7). If the one-frame content data procedure ends (Yes in block B7), the CPU 60 gives instructions to the address generator 82 to generate a new address different from the write address of the flash memory 81 having an error (block B8). When the new address is generated, the CPU 60 controls the switching unit 70 so that the switching unit 70 outputs the content data from the buffer 50 (block B9), and thus, gives output instructions to the buffer 50 (block B1). The content data output from the buffer 50 is stored in the storage device 80. The CPU 60 transfers the procedure to the block 82 to confirm whether or not the content data is normally stored in the storage device 80.

In block B2, if there exists notification that the busy state is completed is not given (No in block B2), the CPU 60 determines whether or not a state that the notification is not given continues for a predetermined time (block B11). If the notification is not given after the predetermined time elapses (Yes in block B11), the CPU 60 transfers the procedure to block B6. If the predetermined time does not elapse (No in block 811), the CPU 60 transfers the procedure to block B2.

In block B3, if a write error occurs (Yes in block B3), the CPU 60 transfers the procedure to the block B6.

In this case, the CPU 60 completes a series of procedures (from block B8 to block B10) of outputting the content data from the buffer 50 and writing it to the flash memory 81 within a free time shown in FIG. 2. If the rewrite procedure is not completed from the reason why a write error again occurs in the content data from the buffer 50, the CPU 60 takes the foregoing series of procedures within a free time generated after the next frame ends. In this case, there is a possibility that the capacity of the buffer 50 is short; therefore, preferably, the buffer capacity has two pages or more.

Although no illustration in FIG. 3, when the rewrite procedure of FIG. 3 ends, the CPU 60 controls the switching unit 70 so that the switching unit 70 selects the content data from the buffer 40. In other words, usually, the content data from the buffer 40 is output via the switching unit 70, and in a rewrite operation only, the content data from the buffer 50 is output via the switching unit 70.

According to the foregoing first embodiment, if the predetermined time elapses in a state that the CPU 60 does not receive the notification that the busy state ends from the state notification unit 83, the CPU 60 determines that write of content data fails. Then, the CPU 60 gives instructions to save the same content data as the write-failed content data to the buffer 50. Further, the CPU 60 saves the write address of the write-failed content data together with the save instructions. The CPU 60 controls the address generator 82 so that the address generator 82 generates a write address different from the write address of the flash memory having an error. Then, the buffer 50 outputs the saved content data, and rewrites the content data to the flash memory based on a new write address. In this way, even if content data write to the flash memory 81 is not completed, the content data recording apparatus can rewrite the content data to the flash memory 81, and therefore, can record the content data to the flash memory 81 normally.

If write to the flash memory 81 is completed, and there exists notification that a write error is detected output from the error detector 84, the CPU 60 determines that write of the content data fails. Then, the CPU 60 saves the write-failed content data in the buffer 50 to rewrite the content data to the flash memory 81. In this way, even if an error occurs in a write operation to the flash memory 81, the content data recording apparatus can rewrite the content data to the flash memory 81, and therefore, can record the content data to the flash memory 81 normally.

If write to the flash memory 81 is completed, and there exists no notification that a write error is detected, the CPU 60 reads the data at the same time as the write completion. The error correction unit 100 corrects the read content data based on an error correction code added to the data. If correction is impossible, the error correction unit 100 gives correction impossible notification to the CPU 60. When receiving the correction impossible notification, the CPU 60 saves the content data that is impossible to correct in the buffer 50 to rewrite the content data to the flash memory 81. In this way, even if write to the flash memory 81 is completed, and a write error is not detected, it is possible to automatically confirm whether or not the content data is normally written. If write to the flash memory 81 fails, the content data is rewritten to the flash memory 81. Therefore, it is possible to compensate for content data loss.

The CPU 60 executes rewrite of the write-failed content data within a free time between one-frame transfer time of the content data and processing time of one-frame content data. This serves to execute rewrite without hindering write of continuously input content data to the flash memory 81.

The flash memory is generally capable of erasing data in units of blocks. Thus, the new write address of the flash memory is generated based on the units of blocks when the error that is impossible to correct occurs. A method to manage a continuity of the content data is adopted in generation of the new write address. As this method does not relate to this invention, the procedure of the generation of the new write address is omitted.

According to the present invention, the content data recording apparatus securely detects a write error without hindering normal write of content data to the flash memory, and records the content data.

The present invention is not limited to the foregoing first embodiment. For example, the content data recording apparatus is provided with two write buffers, and each capacity of the buffers 40 and 50 is two pages. However, the number of write buffers is not limited to two, and the capacity is not limited to two pages.

Second Embodiment

FIG. 4 is a block diagram showing the configuration of a content data recording apparatus according to a second embodiment of the present invention. The same reference numbers are used to designate the same portions as FIG. 1, and the overlapping explanation is omitted.

Content data output from an error correction code addition unit 20 is temporarily held in a ring buffer 120, and then, output to a storage device 80.

The ring buffer 120 has a capacity equivalent to 16 pages. The ring buffer 120 successively writes input content data from the header address to the final address. When the content data is written to the final address of ring buffer 120, the ring buffer 120 writes new content data to its header-address. When content data equivalent to one page is collected, the ring buffer 120 outputs the content data equivalent to one page.

When determining that an error requiring rewrite occurs, a CPU 60 stores an address on the ring buffer 120 of data to be rewritten. When the ring buffer 120 receives instructions to output rewrite data from the CPU 60, the ring buffer 120 outputs the stored content data equivalent to one page.

According to the foregoing second embodiment, if write to a flash memory 81 of the storage device 80 fails, the write filed content data stored in the ring buffer 120 is again output to the storage device 80. Thereafter, the content data is rewritten to the flash memory 81. In this way, even if the ring buffer 120 is used, it is possible to automatically determine whether or not content data is normally written. In addition, it is possible to compensate for the loss of the write-failed content data.

Therefore, the content data recording apparatus according to the present invention securely detects a write error without hindering normal write of content data to the flash memory, and records the content data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A content data recording apparatus comprising:
a code addition unit adding an error correction code to an input content data;
a data storing unit successively receiving the content data added with the error correction code, and temporarily storing the content data, and thereafter, outputting it;
a plurality of nonvolatile memories that enable writing and reading of the content data;

an address generator generating a write address when the content data successively output from the data storing unit is written to the nonvolatile memories and generating a read address when the content data is read from the nonvolatile memories;

a read buffer temporarily storing the content data read from the nonvolatile memories, and outputting the read content data;

an error correction unit correcting an error of the content data output from the read buffer based on the error correction code added to the content data, and giving correction impossible notification when the error is not corrected by the error correction code;

a controller carrying out a read control for reading content data from the nonvolatile memories if no write error is detected while the content data is written to the nonvolatile memories, and carrying out a first rewrite control for controlling the data storing unit so that the data storing unit again outputs content data when receiving the correction impossible notification from the error correction unit, and writing the content data again output to a new write address of the nonvolatile memories; and a write, completion notification unit giving write completion notification if no write error is detected while the content data is written to the nonvolatile memories, the controller carrying out the read control when receiving the write completion notification, and carrying out a second rewrite control for controlling the data storing unit so that the data storing unit again outputs content data when the write completion notification is not received for a predetermined time, and for writing the content data again output to a new write address of the nonvolatile memories.

2. The apparatus according to claim 1, further comprising:
an error notification unit determining whether or not a write error of the content data with respect to the nonvolatile memory occurs, and giving write error notification to the controller when the write error occurs,
the controller carrying out a third rewrite control for controlling the data storing unit so that the data storing unit again outputs content data when receiving the write error notification from the error notification unit, and writing the content data again output to a new write address of the nonvolatile memories.

3. The apparatus according to claim 1, wherein the data storing unit temporarily stores the input content data in units of pages, and outputs the content data equivalent to one page when the content data collects one page,
the nonvolatile memories store the content data written in units of pages, and store the content data equivalent to one page successively output from the data storing unit according to a write address generated by the address generator,
the controller detects write completion of content data to the nonvolatile memories equivalent to one page, and reads write completion content data from the nonvolatile memories in the read control, and
the controller controls the data storing unit so that the data storing unit again outputs content data of page when receiving the correction impossible notification from the error correction unit, and writes the content data again output to a new write address of the nonvolatile memories in the first rewrite control.

4. The apparatus according to claim 3, further comprising:
an error notification unit determining whether or not a write error of the content data with respect to the nonvolatile memory occurs, and giving write error notification to the controller when the write error occurs,
the controller carrying out a third rewrite control for controlling the data storing unit so that the data storing unit again outputs content data of page when receiving the write error notification from the error notification unit, and writing the content data again output to a new write address of the nonvolatile memories.

5. The apparatus according to claim 3, wherein
when the content data has a frame format, the nonvolatile memories and the error correction unit perform one-frame content data processing so that the total time of write time, read time and error correction time of the content data is shortened more than time of performing the processing to content data equivalent to one page with respect to input time of one-frame content data, and
the controller controls the data storing unit so that the data storing unit again outputs content data of a page, and writes the content data again output to a new write address of the nonvolatile memories within the shortened period.

6. The apparatus according to claim 1, wherein the data storing unit includes:
a distributor distributing content data added with the error correction code to a plurality of systems;
a plurality of write buffers provided every distribution system of the distributor, and receiving content data distributed to the corresponding system, and further, outputting the content data after temporarily storing it; and
an output switching unit selectively outputting any one of the write buffers, and switching the output of the write buffers every when receiving re-output control from the controller.

7. The apparatus according to claim 1, wherein the data storing unit uses a ring buffer in which write address circulates as a store medium of the content data.

8. A content data recording method comprising:
adding an error correction code to input content data;
outputting the content data added with the error correction code after temporarily storing the content data;
successively storing the output content data to a nonvolatile memories that enable writing and reading of the content data;
reading the write data from the nonvolatile memories if no write error is detected while the content data is written to the nonvolatile memories;
correcting an error of the content data read from the nonvolatile memories based on the error correction code added to the content data;
giving correction impossible notification when the error of the content data is not corrected by the error correction code;
again outputting the content data to the nonvolatile memories when receiving the correction impossible notification;
writing the content data again output to a new address of the nonvolatile memories;
giving write completion notification if no write error is detected while the content data is written to the nonvolatile memories;
reading the content data written in the nonvolatile memories when receiving the write completion notification;
again outputting content data to the nonvolatile memories when the write completion notification is not received for a predetermined time; and
writing the content data again output to a new write address of the nonvolatile memories.

9. The method according to claim 8, further comprising:
determining whether or not a write error of the content data with respect to the nonvolatile memories occurs;
giving notification that a write error occurs when the write error occurs;
again outputting content data to the nonvolatile memories when receiving the notification that a write error occurs; and
writing the content data again output to a new write address of the nonvolatile memories.

* * * * *